United States Patent [19]

Newkirk et al.

[11] 4,439,636

[45] Mar. 27, 1984

[54] CREDIT CARD ACTUATED TELECOMMUNICATION ACCESS NETWORK

[76] Inventors: Martha Newkirk; Larry Newkirk, both of 8 Park La., Madison, N.J. 07940

[21] Appl. No.: 356,430

[22] Filed: Mar. 9, 1982

[51] Int. Cl.³ .................................... H04M 17/02
[52] U.S. Cl. ........................ 179/7.1 R; 179/6.3 CC; 179/2 CH; 179/2 A; 179/18 B
[58] Field of Search ........... 179/7.1 R, 6.3 CC, 2 CA, 179/2 A, 2 DP, 7 R, 8 R, 18 B, 18 D, 18 DA, 90 CS, 6.3, 6.4; 235/380; 340/825.33, 825.26

[56] References Cited

U.S. PATENT DOCUMENTS

| | | | |
|---|---|---|---|
| 2,615,972 | 10/1952 | Hubbard | 340/825.33 |
| 3,022,381 | 2/1962 | Pferd | 179/6.4 |
| 3,087,018 | 4/1963 | Pferd | 179/6.4 |
| 3,169,168 | 2/1965 | Capranica | 179/6.3 |
| 3,594,727 | 7/1971 | Braun | 340/825.26 |
| 3,665,397 | 5/1972 | Di Napoli et al. | 340/825.3 |
| 3,723,655 | 3/1973 | Zucker et al. | 179/2 DP |
| 3,728,522 | 4/1973 | Norwich | 235/380 |
| 3,752,904 | 8/1973 | Waterbury | 178/5.1 |
| 3,784,793 | 1/1974 | Ito et al. | 235/61.11 D |
| 3,787,623 | 1/1974 | Stephenson | 179/2 DP |
| 3,937,925 | 2/1976 | Boothroyd | 235/380 |
| 3,959,607 | 5/1976 | Vargo | 179/183 |
| 3,982,103 | 9/1976 | Goldman | 235/380 |
| 4,023,014 | 5/1977 | Goldberg | 235/380 |
| 4,048,475 | 9/1977 | Yoshida | 235/380 |
| 4,068,213 | 1/1978 | Nakamura et al. | 340/823.33 |
| 4,197,986 | 4/1980 | Nagata | 235/379 |

*Primary Examiner*—Stafford D. Schreyer
*Attorney, Agent, or Firm*—Michael Ebert

[57] ABSTRACT

A public access network operating in conjunction with existing telecommunication lines to permit a caller holding a machine-readable credit card to make calls from any local station included in the network without having to deposit coins and without human intervention. The network is constituted by a management and master control central linked to a group of satellites installed at different locations, such as airport terminals. At every installation, the satellite services a plurality of local telephone stations each provided with a standard telephone set, a card reader adapted to scan the caller's credit card to derive therefrom a digital signal identifying the card, its number and expiration date, this signal being applied to a local processor to determine whether the card is acceptable to the network. If the card is rejected, the call is terminated, and if accepted, the card data is then transferred from the local processor to a verifying processor at the satellite to test the card number against a stored table of invalid numbers. If the card passes this test the local processor is so advised, the processor then activating the telephone set to permit the caller to dial.

10 Claims, 3 Drawing Figures

CREDIT CARD ACTUATED TELECOMMUNICATION ACCESS NETWORK

BACKGROUND OF INVENTION

This invention relates generally to telecommunications and in particular to a public network operating in conjunction with existing telecommunication lines, making it possible for callers to purchase billable communication services by means of machine-readable credit cards.

While the invention will be described mainly in connection with voice communication, it is to be understood that it is also capable of transmitting over existing telecommunication lines, facsimile images, computer data and any other form of intelligence conveyable over such lines.

A telephone system serving a multitude of parties has to take into account many factors and is therefore inherently complex. The system must be capable of rapidly setting up an exclusive channel between the calling party and any one of a large number of other located at remote points, and a ringing signal alerting the party being called. When a connection is established, the system must insure effective two-way private communication. Economics also come into play, for all of these actions must be realizable at affordable prices. Additionally, for this system to be viable for public use, it must be conveniently billable on a single call basis and it must afford universal access to call any party having a telephone facility.

In its most elementary form, a modern telephone system is composed of several central offices at different sites which are interconnected by true lines, each central office serving a large number of local telephone sets coupled to the office by loop circuits. At the central office, various switching functions are carried out automatically. Thus when the caller raises his set, and in doing so actuates a switch, his calling line must be identfied and a connection made thereto. A switching mechanism at the central office then acts to pick out an available transmission path to the called party who may be connected to the same switchboard or to some distant switchboard reached over one or more trunk lines.

The central office must also determine whether the called line is already in use and be able to signal the called station. When the parties at both ends terminate their conversation and hang up their sets, all circuits must then be restored to a state in readiness for other calls. It is also necessary to billing purposes to record the location and duration of the call.

Such central offices are established by local operating telephone companies to service a multitude of residences or business phones. Alternatively, a single business, a building complex or an otherwise defined area of high volume usage may supply its own central office function, i.e. switching equipment to service its user's calls and to link them to local operating company or other transmission lines. Thus a multitude of private telecommunication switching systems using private branch exchange (PBX) or other switching devices, have been installed in recent years to service businesses of all sizes.

A properly designed telephone system must have sufficient trunk capacity between switching points to meet the demand for services during busy periods and thereby avoid excessive delays in making a connection. Modern automatic switching mechanisms such as those used to provide the central office function to high volume business areas also provide for alternate routing to select the least expensive route and to circumvent the failure of a link in the preferred routing of a call, or when the facilities are temporarily overloaded. These switches have not heretofore been useable to carry out the central office function in a truly public application. These switches are however widely used to reduce telecommunication costs for businesses and to provide more efficient specifically applied communications for their use.

In order to introduce competition into the telephone services market, the Federal Communications Commission (FCC) recently authorized the reselling of bulk telecommunication services. Thus it is now possible for a private operator to purchase WATS or other bulk rates services from the Bell System and make them available to the public at rates below those that would have to be paid by users making calls directly through the Bell System.

WATS, or wide area telephone service, allows a customer to call anyone in one or more of the six regions into which the continental U.S. has been divided on a direct dialing basis for a flat monthly charge related to the number of regions to be called.

These FCC rulings have been construed to authorize resellers to provide telephone service to the public using switching devices as described above, which service heretofore was offered only by proprietors of telecommunication network facilities. The present invention now renders technically feasible and realizable that which the FCC has stamped as legally permissible.

The present invention is a solution to many practical problems encountered when making calls in public telephone booths of the conventional type. To illustrate a typical situation, we shall assume that a Mrs. Smith is scheduled to fly from New Yor to Chicago to visit her son, and that she has just been advised at the airport terminal that the departure of her flight has been delayed for two hours.

Since Mrs. Smith will not be able to meet her son in Chicago at the expected time, she goes to a public pay phone at the airport terminal and deposits a dime in the coin receiver. This gives her a dial tone. She then dials her son's Chicago telephone number, at which point her dime is returned and she hears the operator who instructs her to deposit two dollars and fifty cents in coins (or some such amount) for the first three minutes.

The fact that Mrs. Smith then finds that she lacks sufficient coins for this purpose should surprise no one, for this is a commonly experienced inconvenience. When Mrs. Smith finally succeeds in changing some bills to obtain the necessary coins, she must redial the number; but even then she may face a new problem. Should Mrs. Smith's call run overtime and the operator demands additional coins, she may not have them in her possession and be cut off.

We shall now replace Mrs. Smith by her husband, Mr. Smith, a businessman who is a frequent traveler and carries a Bell Telephone credit card. This card assigns Mr. Smith a 14 digit number made up of his area code and business phone number (totally 10 digits) plus 4 additional code digits. Mr. Smith need not in the same situation concern himself with a dearth of coins beyond the dime necessary to reach the operator. All he need then do is to read off to the operator his 14 digit number.

Only a relatively limited number of subscribers are in the possession of telephone company credit cards which relieve the holders of the need to deposit coins in public telephones. However, such cards are not free of practical drawbacks, for they prolong the time necessary to make a call. The caller, in addition to having to dial or key in the number of the party being called, must also supply the 14 digit credit card number.

Moreover, there is the risk that one who overhears or is otherwise informed of the 14 digit number may make unauthorized and costly long distance calls that will be billed to the card holder. The security inherent in ordinary commercial credit cards which carry a signature that can be checked and which must be presented to the seller to complete a transaction, is absent in telephone credit cards; for all one need do to make a credit call is to know the card number.

It is estimated that the five major credit card companies (Master Card, Visa, American Express, Diners and Carte Blanche) have in circulation more than 70 million credit cards. Nevertheless, the familiar statement that such cards render cash transactions obsolete is not entirely true. Though a card holder can use his card to pay for travel, lodging, food, entertainment, clothing and virtually anything else that is purchaseable, excluded from this extraordinary convenience is the ubiquitous public pay phone. Yet the public phone performs a vital function; for when away from home or office, we are all put in the position of having to use such phones to make calls.

The term "major credit cards" as used herein refers to credit cards which are nationally recognized and honored, as distinguished from those special credit cards issued by department stores and similar organizations and which are honored only by these organizations.

The term "machine-readable credit card," as used herein, is meant any card which contains identifying indicia in any form that can be magnetically, optically or otherwise scanned to generate digital signals representative of this data. Thus the existing major cards contain a magnetic stripe which when scanned yields signals identifying the nature of the card as well as the card holder's number and expiration date. However, the invention is also applicable to machine readable cards of the character-recognition type or which have magnetically embedded indicia or so-called "smart" cards which incorporate microcircuits.

SUMMARY OF INVENTION

In view of the foregoing, the main object of this invention is to provide a public access network which operates in conjunction with all existing and publically available transmission lines, the network making it possible for a caller holding a major credit card to make universal calls from any local telephone station included in the network without the need to deposit coins and without human intervention.

While the invention is especially valuable in making long distance calls from a local telephone station, the rising cost of local phone service now justifies the use of credit cards for this purpose. The term universal therefore covers calls made to any point near or remote without any restriction.

More particularly, an object of this invention is to provide a network of the above type in which local telephone stations may be installed at public facilities, the local stations at each facility being linked to a facility satellite, and in which the satellites at the various facilities are linked to a remote management and master control central which acts to supervise the operation of all satellites and to generate credit card billing information for the long distance calls made from all local stations in the network.

By public facilities is meant not only airports, for this term encompasses convention centers, shopping centers, hospitals, hotels or any other place of the type which now has a pay telephone.

A significant advantage of a network in accordance with the invention is that a universal call can be made in significantly less time than it now takes to make a call in a pay phone or by means of a telephone credit card. And of even greater significance is the fact that the network obviates the need for costly operators and the caller can therefore be charged a markedly lower rate than he would have to pay in a conventional operator-controlled pay phone booth for the same call. Moreover, the invention makes it possible, by association with a WATS or other bulk rate lines, to resell communication services at a lower rate than would otherwise be possible.

Yet another object of the invention is to provide a public access network largely made up of known components that are mass-produced and commercially available so that the overall cost of the network, despite the unique functions it performs, is relatively modest.

Briefly stated, these objects are attained in a public access network operation in conjunction with existing telecommunication lines to permit a caller holding a machine-readable credit card to make universal calls from any local station included in the network without having to deposit coins and without human intervention. The network is constituted by a management and master control central linked to a group of satellites installed at different locations, such as airport terminals.

At every installation, the satellite functions to service a plurality of local telephone stations each provided with a standard telephone set, a card reader adapted to scan the caller's credit card to derive therefrom a digital signal identifying the card, its number and expiration date. This signal is applied to a local station processor to determine whether the card is acceptable to the network. If the card is rejected, the call is terminated forthwith; and if accepted card data is then transferred from the local processor to a verification processor at the satellite to test the card number against a stored table of invalid numbers.

If the card passes this test the local processor is so advised and the telephone set is activated thereby to permit the caller to dial. An intelligent switch at the satellite receives the number dialed from the activated telephone set and connects this set to an appropriate transmission line to put the call through.

Central functions not only to update the invalid card tables in the satellites and to manage the operation of the intelligent switches, but also to extract therefrom the details of calls made from the local stations and the related credit card data to generate a billing record for submission to the various credit card companies.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

The Public-Access Network

Figure 1:
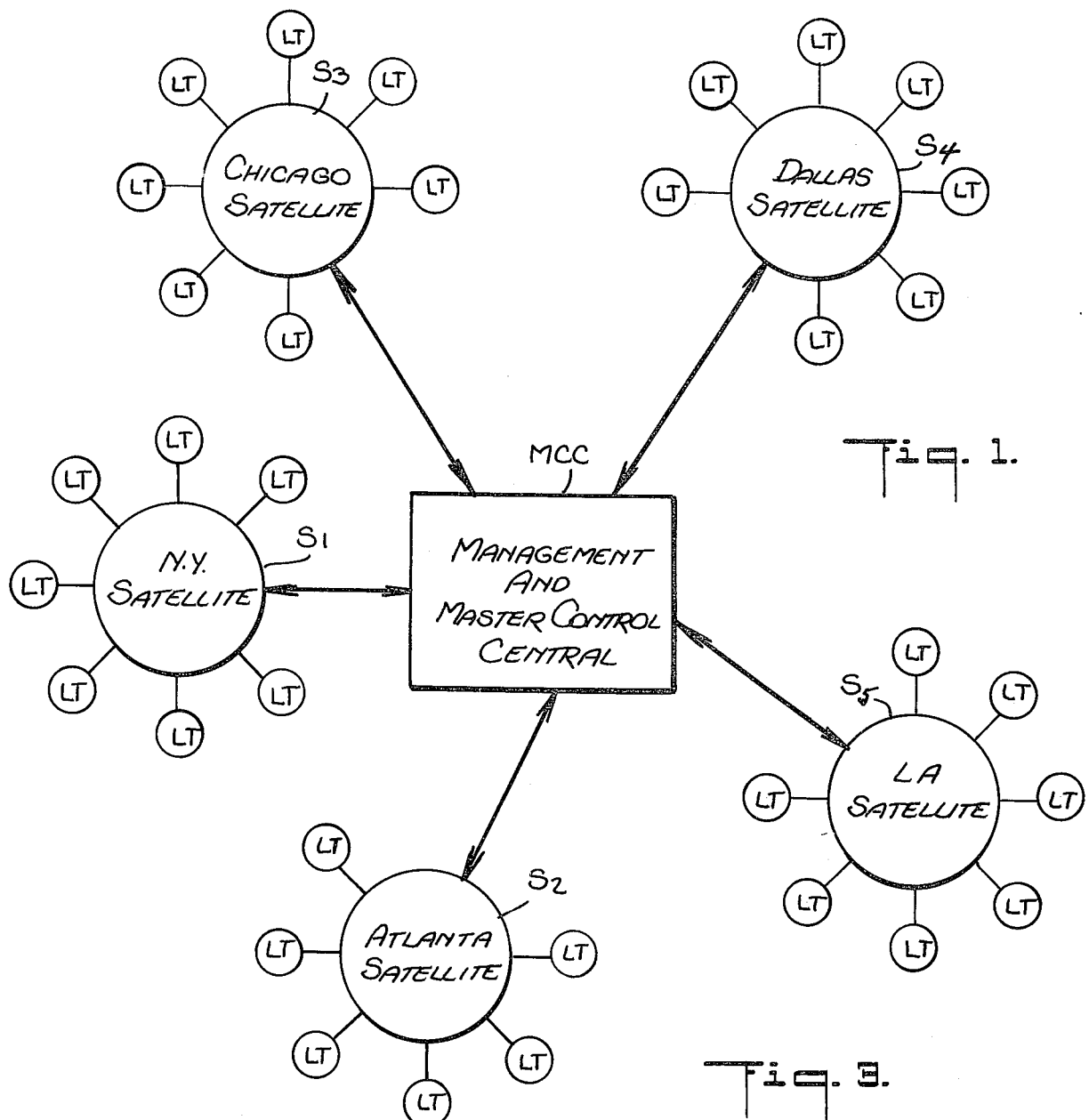
FIG. 1 is a block diagram of a public access network in accordance with the invention.

Referring now to FIG. 1, there is shown a public access network in accordance with the invention operating in conjunction with existing telecommunication lines. By existing lines is meant the national telecommunication network established by AT&T, its operating companies, the various independent telephone companies and specialized common carriers, that is to say all telecommunication lines capable of being tied into an access network in accordance with the invention.

To illustrate the network in a simplified version, we shall assume installations at five high traffic locations, these being airport terminals at New York, Atlanta, Chicago, Dallas, and Los Angeles; the locations, therefore, being dispersed throughout the continental United States. At each of these airports there is installed a satellite S; hence in the example shown we have satellite $S_1$ in New York, satellite $S_2$ in Atlanta, $S_3$ in Chicago, $S_4$ in Dallas and $S_5$ in Los Angeles.

Linked to each satellite is a plurality of local public telephone stations LT, these being placed at convenient points throughout the airport terminal. The several satellites are all linked to a management control central MCC which can be located anywhere, such as Ohio. The links between the central and the satellites may be by private lines or by wireless communication. In practice, the links between the local stations and the satellite may be wired links, a microwave wireless link or any other linkage means.

When a caller holding a major credit card is at any one of the airports serviced by the network and he wishes to make a call, he goes to the nearest available public telephone station PT. This station will be marked to distinguish it from conventional pay phone booths. Thus the station sign may read "Credit Card Phone".

Each station is equipped with a standard telephone set which may be wall or desk mounted, the set including a dial or keyboard, but no coin receiver. Also at the station is a credit card reader slot to accommodate the caller's card. Assuming that the reader is designed to read cards bearing magnetic stripes, it may be of the type which requires the user to slide the card through the slot to effect magnetic scanning, or of the type in which a stationary card inserted in the slot is scanned by a traversing head. In either case, the digital signal yielded by the reader provides digital data identifying the nature of the card (i.e., American Express, Visa, etc.), the holder's number and also the expiration date of the card.

At the local station this data is screened by a local processor to determine whether the card is prima facie acceptable; that is, whether the card is a major card that the network can accommodate and whether it has an unexpired date. If the local processor rejects the screened card, this activates an associated voice chip (or other automatic message means) which advises the caller of this fact and immediately terminates the call. But if the card is prima facie acceptable the caller's card data is transferred from the local telephone processor to the related satellite where it is tested in a verification processor against a stored listing or table of invalid numbers. Currently, of the approximately 70 million cards issued by Master Card, American Express and other national credit card organizations, about 6 million are posted as invalid, either because the card has expired, has been cancelled for non-payment or is stolen.

Hence to test the validity of a card whose number has been read at the local station by the reader, it is only necessary to determine whether the submitted card number appears in the table of invalid numbers for the issuing company. While this test is carried out at the satellite, the testing of invalid numbers stored in memory at the satellite is under the supervision of the management and master control central MCC which receives numbers posted as invalid from the various credit card organizations and updates the listings at the satellites as new numbers are posted or numbers are revalidated.

If a caller's card passes the verification test at the satellite, the local processor is advised of this fact and the processor activates the telephone set which gives the caller a dial tone permitting him to dial his number. At the satellite an intelligent digital switch connects the caller's telephone set at the local station linked thereto to the appropriate line of the telecommunication system to which the satellite is coupled. A considerable savings may be realized by making use of WATS and private lines or foreign exchanges in conjunction with the intelligent switching units which are adapted to choose the optimum or least expensive line for the call being made.

The duration of the calls, the location of the called station and all other pertinent details are transmitted from the satellites to the management and master control central MCC where call data and the card data are recorded to provide billing records. The billing records and the appropriate charges for the calls made by the card-holding callers are preferably recorded on magnetic tape, from which the necessary records are compiled and sorted for distribution to the various credit card companies. This will be generated in a manner compatible with established billing cycles at these companies, so that the itemized monthly statements issued by the credit card companies will include the charges for calls made by the card holders.

The Structure of the Network Components

Figure 2:
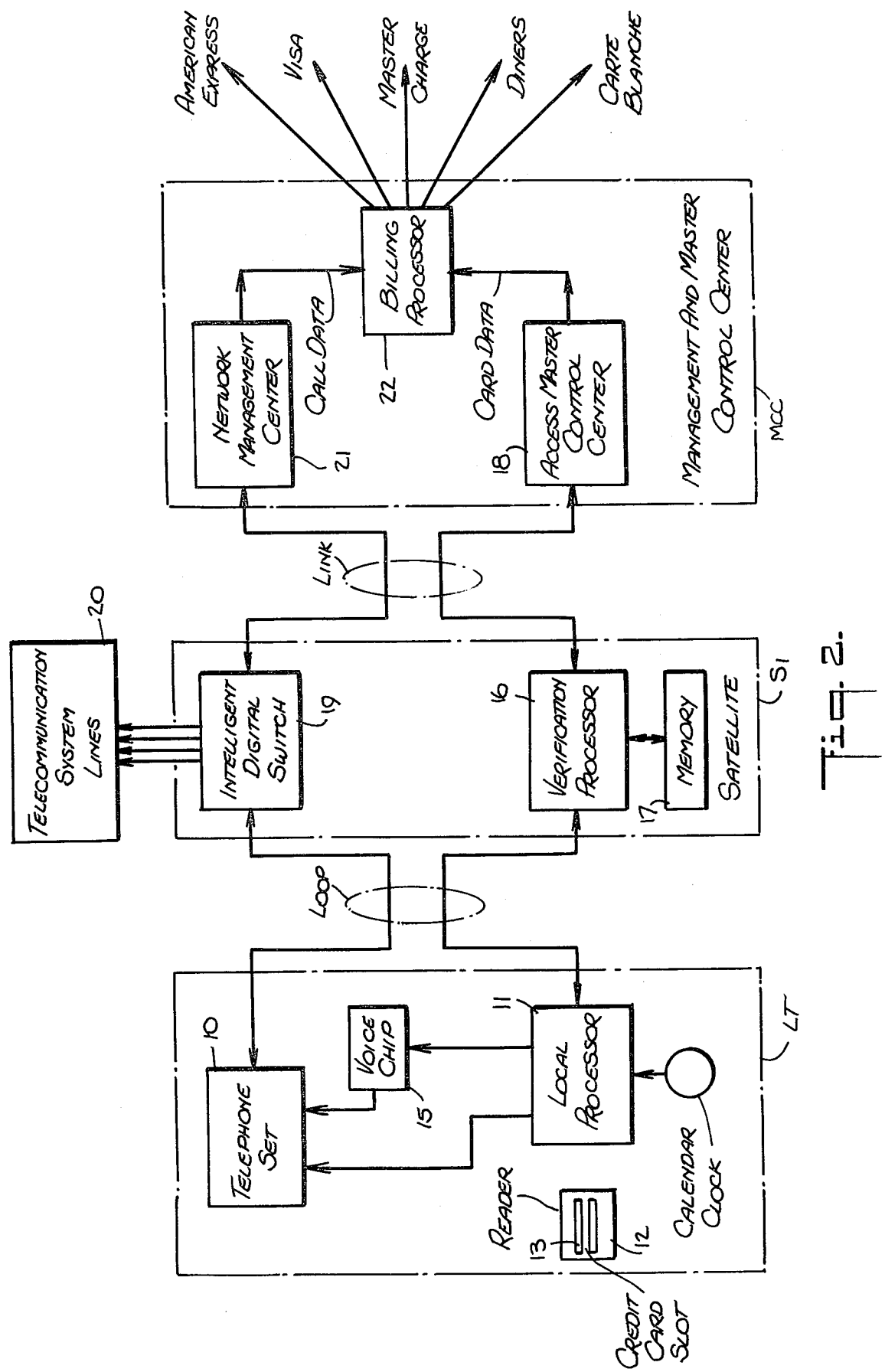
FIG. 2 illustrates in greater detail the components which make up the management of central control, one of the satellites and one of the local telephone stations included in the network.

Referring now to FIG. 2, there is shown in block form the basic elements which make up the management and master control center MCC common to all satellites in the network, one of these satellites ($S_1$) linked to this center, and one of the many local stations LT services by this satellite.

Local station LT is provided with a standard telephone set 10 activated by a local processor 11 responsive to digital signals derived from a credit card reader 12 having a slot 13 adapted to receive a caller's credit card. The card scanned thereby causes the reader to yield a digital signal identifying the nature of the card, its number and expiration date. The screening conducted by local processor 11 is not concerned with the validity of the card, but only with its acceptability to the network; that is, whether the card is a major credit card issued by a company which cooperates with the operator of the network, and whether this card is unexpired and therefore admissible.

To this end, the local processor checks the data identifying the credit card company against a stored table of acceptable cards and checks the data giving the expiration date of the screened card against the existing calendar date supplied to the processor by an electronic calendar clock 14.

Local processor 11 also controls a voice chip 15 coupled to telephone set 10 which interacts with the caller during the card screening process carried out at the station and the card verification process carried out at the satellite. Voice chip has synthetic voice messages stored therein which are selected by the local processor. Thus if the card is rejected by the local processor as non-acceptable, the caller is so advised by a computer-generated message and the call terminated forthwith; but if the card is found acceptable, the local processor transfers the card data to the verification processor 16 in the associated satellite.

In lieu of computer-generated voice messages use may be made of LCD and other displays to provide printed messages. In practice, other means may be used to give the caller messages without the need for a human operator.

Verification processor 16 in satellite $S_1$ checks the calling card number against the table of invalid numbers stored in its memory 17. Verification processor 16 is linked to the access master control center 18 which generates a "negative" table file based on information received from the credit card companies cooperating with the network operator, the control center downloading this information to the verification processor in each satellite associated therewith.

If verification processor 16 finds the calling card to be invalid, this rejection is conveyed back to the local processor 11 at the local station which again activates chip 15 to tell the caller that his call is terminated, the local processor cutting off the telephone set. If however verification processor 16 at the satellite finds the calling card valid, the local processor 11 linked thereto is advised of this fact and it activates telephone set 10 which then generates a dial tone permitting the caller to dial his number.

The activated telephone set is coupled to intelligent digital switch 19 which in turn is coupled to the telecommunication lines 20, this switch then connecting telephone set 10 to the appropriate line for the telephone number dialed by the caller. The selection of the appropriate line by switch 19 is under the supervision of the network management center 21 at central MCC which manages route optimization decisions for the intelligent switches in all of the satellites either centrally or by downloading tables.

In order to provide billing information, a billing processor 22 at central MCC is coupled both to network management center 21 and access master control center 18. Management center 21 collects from the intelligent digital switches at the several satellites the necessary details of the calls made through the switches; that is, the duration and placement of the calls and the transmission line selected therefor so that the proper charge can be made for each call, this information representing one input to billing processor 22. Access control center 18 collects from the verification processors 16 at the several satellites, the identification data taken from the credit cards used by the callers, so that each charged call can be assigned to the credit card of the caller.

Proper merging of the call detail record obtained by the management center 21 with the credit card details obtained by the access control center 18 is based on a comparison of exact time. The initiation of a transaction for a given local telephone station is recorded in both systems using synchronized internal clocks. Magnetic tapes of billable charges can then be compiled and sorted for distribution to the credit card companies in the manner previously explained.

Telecommunication Alternatives

Figure 3:
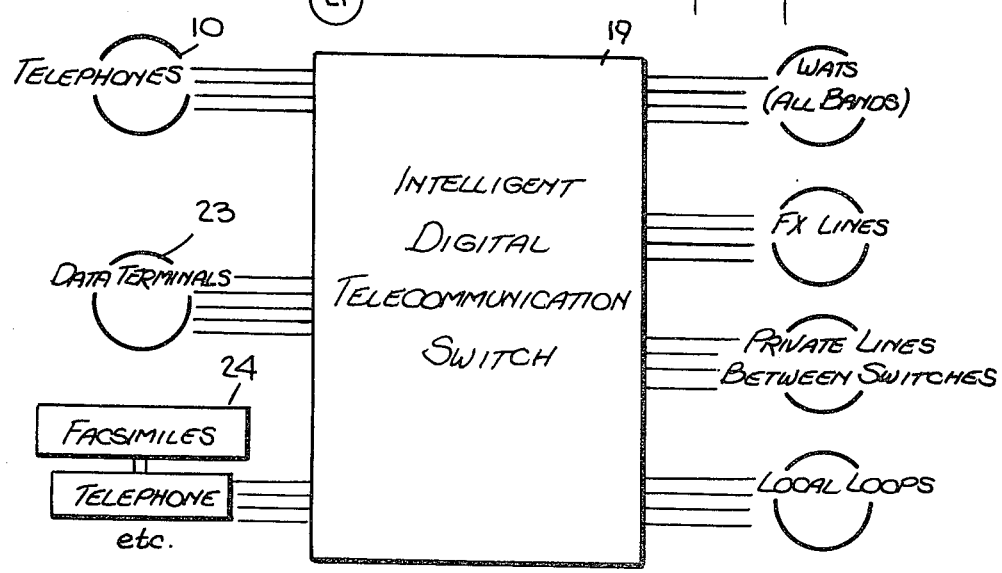
FIG. 3 illustrates the manner in which the intelligent digital switch acts to provide a broad range of telecommunication services.

As shown in FIG. 3, with respect to one of the intelligent switches 19 included in the network, each of these switches is selectively connectable to a range of telecommunication lines; i.e., WATS (all bands), FX lines, private lines between switches and local loop.

And while in the network previously disclosed, each intelligent switch 19 at a given satellite is connected to the telephone sets 10 at the local station linked to the satellite, in practice, the switch may be linked to other local communication terminals such as computer data terminals 23 or facsimile-telephone terminals 24, all of which produce data transmittable over telecommunication lines.

Components

In a network in accordance with the invention made up of a management and control central MCC, a group of satellites S linked to central, and a plurality of local stations LT looped to each satellite, the only components in the network which fall into the class of telephone equipment are the telephone sets 10 and the intelligent digital switches 19. The telephone sets are or standard design and are available from many commercial sources. The switches are also commercially available. Thus, among the commercially-available digital intelligent switches which are usable are Telcom SL-1, Rockwell-Galaxy or Westcom 580 and Harris D-1200. Also usable for this purpose are commercially-available digital PBX's.

All of the other components are in the form of digital processors or mini-computers which are adapted or programmed to carry out the functions assigned to them by the network. Thus the local processor 11 is a processor adapted to perform a comparison with respect to digital data representing a caller's card and stored data which indicates which credit cards are admissible to the network, this processor also comparing the expiration date on the card with the calendar date on which the call is being made. The local processor also controls the response to the user. The management center 21, on the other hand, is a mini-computer programmed to make decisions as to the test route to be selected by the intelligent switches under its control, while the billing processor 22 must calculate the charges to be imposed on the calls. Thus all of the processors must be capable of carrying out logic or arithmetic function.

All of the basic components included in the system shown in FIG. 2 are well known and commercially available. Thus the telephone set 10 may be a Miniwall SC 2554 BPTPHM-CRD unit made by ITT or Stromberg Carlsen. Voice chip 15 may be a TMS 2716-EPROM unit made by Texas Instruments Company. The card reader 13 may be a model 801 card reader manufactured by AMP Inc. The local processor 11 may be a MC 6808 unit made by Motorola; and the calendar clock, a model MSM 5832 made by OKI.

The Intelligent Switch 19 may be an SL-IM made by Northern Telecon, and verification processor 16 may be a PDP-11 unit made by Digital Equipment Corporation. The memory 17 may be a RK07-Disc Drive memory manufactured by Digital Equipment Corporation. All blocks included in the Management and Master Control Center MCC can be implemented by a single computing device such as the VAX 11/750 made by Digital Equipment Corp.

A digital computer is capable of carrying out arithmetic or logic operations on data entered therein and of yielding numerical results or decisions. Whether in the form of large-scale, general-purpose computer, a minicomputer or a microcomputer, all digital computers are essentially composed of a central processing unit, a memory system and some form of an input-output device.

The task assigned to a central processing unit is to receive and to store for later processing in a memory data in the form of binary digits or bits, to perform arithmetic or logic operations on this data in accordance with previously-stored instructions, and to deliver the results in terms of digital signals or through a read-out device such as a printer.

The central processing unit (CPU) is that component of the computer which controls the interpretation and execution of instructions. In general, a CPU contains the following elements: "Control" which includes control logic and instructions for decoding and executing the program stored in "Memory;" "Registers" which provide control with temporary storage for bits, bytes or words; and Arithmetic and Logic Unit that performs arithmetic and logic operations under the supervision of Control; and Input-Output ports providing access to peripheral devices such as a keyboard.

The memory system is that component of the computer which holds data and instruction codes, each instruction or datum being assigned a unique address that is used by the CPU when fetching or storing the information. The read-only memory or ROM is a memory adapted to store information permanently, such as a match function or a micro-program (a special purpose program initiated by a single instruction in the system's main program.) A memory that can be programmed by the user, but only once, is known as a programmable ROM or PROM; hence when a PROM is programmed, it then functions as a ROM.

The capability of a computer depends in good part on the storage capacity of its memory system. The amount of information stored ranges from fewer than 100 bits, as in simple pocket calculators, to more than a billion bits for a large-scale computer. Integrated-circuit memories based on transistors are designed to store bits of binary digits on a chip.

The basic "hardware" components of a digital computer are the central processing unit (CPU), the memory system and input-output devices. The registers, the control and the arithmetic logic unit of the CPU are linked with the memory system and the input-output device by a data bus; that is, a group of wires that allows the memory, the CPU and the input-output device to exchange signal bits, bytes or words. Where time is a factor, as in local processor 11, associated therewith is a real time clock. In practice, the computer's power supply may have a battery pack back-up so that the power remains uninterrupted should the supply fail. Computer memories may include a local lithium battery so that the memory is nonvolatile and will continue to store data in the event of a power failure.

The voice chip may be any commercially-available microelectronic device in which the messages are stored therein in digital form and when read out are converted into audio signals by a digital-to-analog converter. Thus all components which in combination make up the system are commercially-available; hence the overall cost of the system is relatively modest.

With respect to the use of the access network for forms of communication other than voice, instead of local telephone stations linked to the satellite at say an airport, the airport may have a communication center tied in with the satellite, at which center there are facsimile and other data terminals which are card-operated in the manner of the invention.

While there has been shown and described a preferred embodiment of a credit card actuated telecommunication network in accordance with the invention, it will be appreciated, however, that many changes and modifications may be made therein without departing from the essential spirit thereof. Also while the invention has been described in conjunction with telephone services, the credit-card read-out acceptance and verification procedure is useable with other services such as the purchase of gasoline at gas station pumps.

We claim:

1. A public access network operating in conjunction with telecommunication lines leasable from a common carrier at a bulk rate, making it possible for callers holding a machine-readable credit card provided with a magnetic stripe and issued by any one of a predetermined plurality of credit card companies authorizing the holder to purchase merchandise and services to dial calls from any local station included in the network, the network comprising:

A. a group of satellites each installed at a different location, each satellite having an intelligent digital switch coupled to said telecommunication lines to effect a connection to that one line included in said lines which is appropriate to a call dialed;

B. averification processor provided with a calendar clock, and means to compare the expiration date on a credit card presented by a caller with the date on which the call is dialed;

C. a plurality of local stations at each location linked to the installed satellite, each station being open to the public and being provided with a communication set which when activated is coupled to the intelligent switch at the installed satellite, a card reader including a magnetic head for scanning the stripe on the caller's card and deriving therefrom a digital signal identifying the company issuing the card, its serial number and expiration date, and activation means responsive to said signal to determine if the scanned card is acceptable to the network, said means transferring the signal to the verification processor which tests the card number against a stored table in invalid card numbers to determine its validity and which, if the card passes this test, then functions to activate the communication set to permit the caller to dial, the activated set being then coupled to said switch which engages said one of said transmission lines to cause the call to go through; and D. A control central linked to the satellites in the group to supervise the operations thereof, said central extracting information from the intelligent switch at each satellite regarding the duration and placement of each of the calls made at the local stations, which information is coordinated with information it extracts from the verification processor regarding the identity and the serial number of the credit cards of the callers making said calls, from which coordinated information the central generates a billing record for submission to the companies issuing the cards, whereby each company can then directly bill their card holders for calls made through the network without obtaining billing information from the common carrier.

2. A network as set forth in claim 1, wherein said communication set is a telephone set.

3. A network as set forth in claim 1 wherein said central includes a network management center linked to the intelligent switch of each of the satellites.

4. A network as set forth in claim 3, wherein said central further includes an access control center coupled to the verification processors in said satellite to update the tables of invalid numbers therein.

5. A network as set forth in claim 1, wherein said central further includes a billing processor coupled to said management center to derive therefrom the details of the calls made through the switches and coupled to the access control center to derive therein data relating to the cards of the callers making the calls, said billing processor merging the details and data to provide credit card billing information.

6. A network as set forth in claim 5, wherein said billing processor operates in conjunction with a magnetic recorder to record the billing information.

7. A network as set forth in claim 1, wherein each location is a different airport terminal.

8. A network as set forth in claim 1, wherein each local station is linked to the satellite by wires.

9. A network as set forth in claim 1, wherein said activation means includes a local processor responsive to said signal to determine whether the card is issued by one of said plurality of companies and to transfer said signal to the verification processor only if the card is so issued.

10. A network as set forth in claim 9, wherein said local processor operates in conjunction with a voice chip having messages therein which are selected by the local processor and delivered to the telephone set to instruct the caller, so that if the inserted card is rejected, the caller is so advised by a message from the voice chip.

* * * * *